United States Patent
Alyanak

(12) 
(10) Patent No.: US 7,303,144 B2
(45) Date of Patent: Dec. 4, 2007

(54) REDUCTION IN HYDROCARBON EMISSION VIA SPRAY PATTERN CONTROL THROUGH FUEL PRESSURE CONTROL IN FUEL INJECTION SYSTEMS

(75) Inventor: Zeki Alyanak, Yorktown, VA (US)

(73) Assignee: Siemens VDO Automotive Corporation, Auburn Hills, MI (US)

( * ) Notice: Subject to any disclaimer, the term of this patent is extended or adjusted under 35 U.S.C. 154(b) by 77 days.

(21) Appl. No.: 10/859,099

(22) Filed: Jun. 3, 2004

(65) Prior Publication Data
US 2004/0256500 A1 Dec. 23, 2004

Related U.S. Application Data

(60) Provisional application No. 60/475,398, filed on Jun. 3, 2003.

(51) Int. Cl.
*F02M 59/00* (2006.01)
*F02M 47/02* (2006.01)
*B05B 1/00* (2006.01)

(52) U.S. Cl. ............... 239/88; 239/533.2; 239/533.12; 239/533.14; 239/585.3; 239/585.4; 239/585.5; 239/533.3

(58) Field of Classification Search .............. 239/88, 239/89, 91, 92, 533.2, 533.3, 533.12, 533.14, 239/585.3, 585.4, 585.5; 251/129.15, 129.21
See application file for complete search history.

(56) References Cited

U.S. PATENT DOCUMENTS

| | | | |
|---|---|---|---|
| 4,292,945 A | 10/1981 | Kiesling | 123/438 |
| 4,543,937 A | 10/1985 | Amano et al. | |
| 4,646,974 A * | 3/1987 | Sofianek et al. | 239/463 |
| 4,653,452 A | 3/1987 | Sawada et al. | |
| 5,244,154 A * | 9/1993 | Buchholz et al. | 239/590.3 |
| 5,449,114 A | 9/1995 | Wells et al. | 239/5 |
| 5,546,912 A | 8/1996 | Yamada et al. | |
| 5,570,841 A * | 11/1996 | Pace et al. | 239/585.1 |
| 5,839,413 A | 11/1998 | Krause et al. | |
| 5,931,391 A * | 8/1999 | Tani et al. | 239/585.4 |
| 6,234,128 B1 | 5/2001 | Reuss | |
| 6,279,844 B1 * | 8/2001 | Shen et al. | 239/585.4 |
| 6,382,188 B2 | 5/2002 | Hasegawa et al. | |
| 6,405,946 B1 * | 6/2002 | Harata et al. | 239/533.12 |
| 6,520,156 B2 | 2/2003 | Kojima | |
| 6,526,947 B2 | 3/2003 | Shimada et al. | |
| 6,604,508 B2 | 8/2003 | Meffert | |
| 6,705,274 B2 * | 3/2004 | Kubo | 123/295 |
| 2002/0189579 A1 | 12/2002 | Holtman | 123/261 |
| 2003/0015595 A1 | 1/2003 | Peterson, Jr. | 239/5 |

OTHER PUBLICATIONS

PCT International Search Report filed Sep. 6, 2004 (PCT/US2004/018347) and date of mailing Nov. 5, 2004.

* cited by examiner

*Primary Examiner*—Davis D. Hwu

(57) ABSTRACT

Among other aspects shown and described, a fuel supply apparatus that provides multiple fuel spray targeting angles as a function of fuel pressure towards a combustion chamber of an engine to reduce hydrocarbon emission during cold-start or hot-start. A method and fuel system are also shown and described.

20 Claims, 4 Drawing Sheets

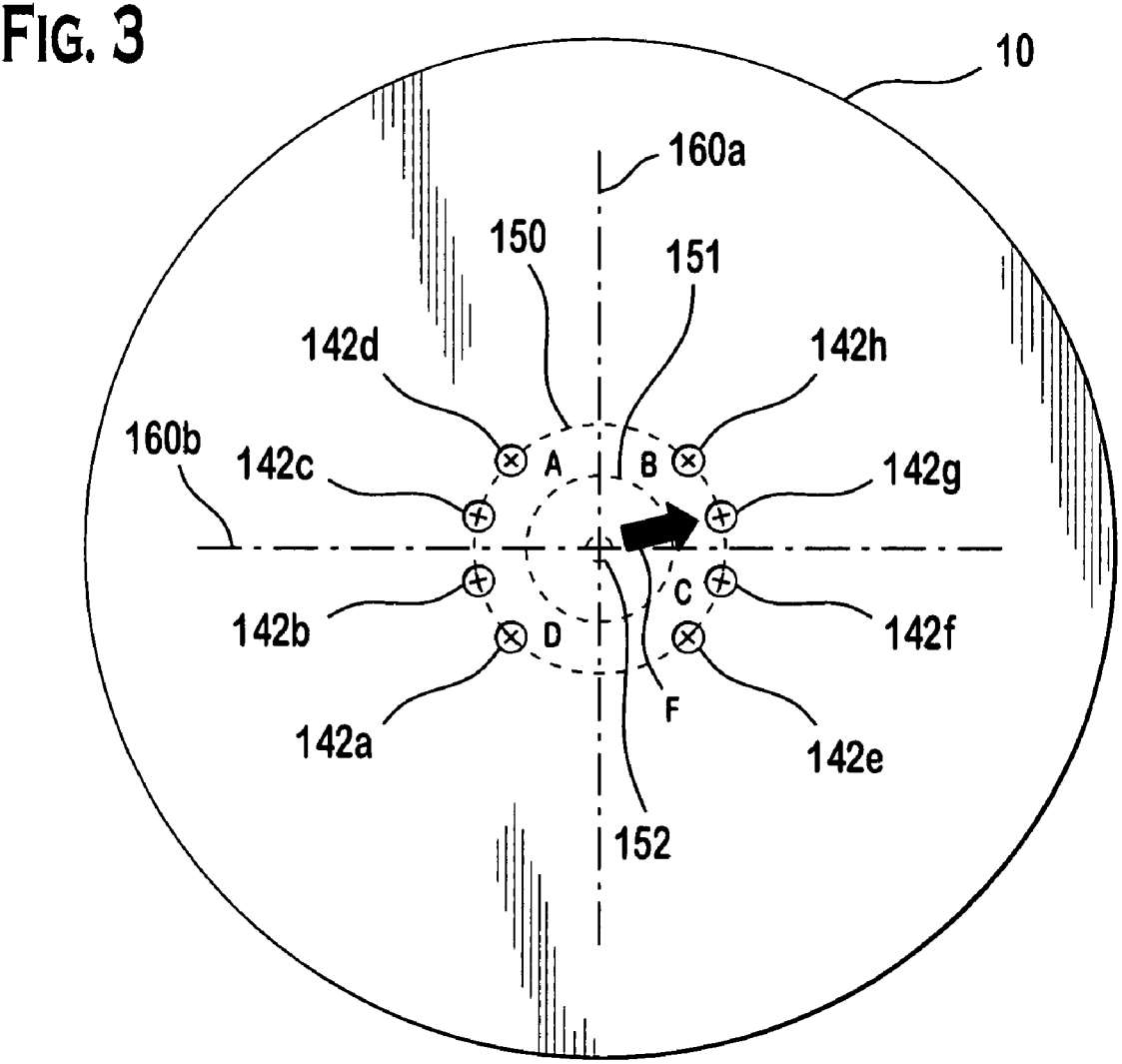

REDUCTION IN HYDROCARBON EMISSION VIA SPRAY PATTERN CONTROL THROUGH FUEL PRESSURE CONTROL IN FUEL INJECTION SYSTEMS

This application claims the benefits of U.S. provisional patent application Ser. No. 60/475,398 filed on Jun. 3, 2003, entitled "Reduction in Hydrocarbon Emission During Cold-Start by Means of Varying Injector Spray Targeting by Means of Varying Fuel Pressure," which provisional patent application is herein incorporated by reference in its entirety.

BACKGROUND OF THE INVENTION

Most modern automotive fuel systems utilize fuel injectors to provide precise metering of fuel for introduction into each combustion chamber. Additionally, the fuel injector atomizes the fuel during injection, breaking the fuel into a large number of very small particles, increasing the surface area of the fuel being injected, and allowing the oxidizer, typically ambient air, to more thoroughly mix with the fuel prior to combustion. The metering and atomization of the fuel reduces combustion emissions and increases the fuel efficiency of the engine. Thus, as a general rule, the greater the precision in metering and targeting of the fuel and the greater the atomization of the fuel, the lower the emissions with greater fuel efficiency.

An electro-magnetic fuel injector typically utilizes a solenoid assembly to supply an actuating force to a fuel metering assembly. Typically, the fuel metering assembly is a plunger-style needle valve which reciprocates between a closed position, where the needle is seated in a seat to prevent fuel from escaping through a metering orifice into the combustion chamber, and an open position, where the needle is lifted from the seat, allowing fuel to discharge through the metering orifice for introduction into the combustion chamber.

The fuel injector is typically mounted upstream of the intake valve in the intake manifold or proximate a cylinder head. An inlet of the fuel injector can be coupled to a fuel supply while an outlet of the fuel injector can be coupled to an intake manifold in a non-direct injection application (e.g., low pressure indirect injection) or to a cylinder head in direct injection application (e.g., high-pressure direct injection). Fuel is supplied under pressure to the inlet of the fuel injector. As the intake valve opens on an intake port of the cylinder, a valve disposed inside the fuel injector is actuated so that fuel is permitted to exit the outlet and spray towards the intake port. In one situation, it may be desirable to target the fuel spray at the intake valve head or stem while in another situation, it may be desirable to target the fuel spray at the intake port instead of at the intake valve. In both situations, the targeting of the fuel spray can be affected by the spray or cone pattern. Where the cone pattern has a large divergent cone shape, the fuel sprayed may impact on a surface of the intake port rather than towards its intended target. Conversely, where the cone pattern has a narrow divergence, the fuel may not atomize and may even recombine into a liquid stream. In either case, incomplete combustion may result, leading to an increase in undesirable exhaust emissions.

Complicating the requirements for targeting and spray pattern is cylinder head configuration, intake geometry and intake port specific to each engine's design. As a result, a fuel injector designed for a specified cone pattern and targeting of the fuel spray may work extremely well in one type of engine configuration but may present emissions and driveability issues upon installation in a different type of engine configuration. Additionally, as more and more vehicles are produced using various configurations of engines (for example: inline-4, inline-6, V-6, V-8, V-12, W-8 etc.,); emission standards have become stricter, leading to tighter metering, spray targeting and spray or cone pattern requirements of the fuel injector for each engine configuration.

It would be beneficial to develop a fuel injector in which spray pattern and precise targeting can be changed so as to meet a particular fuel targeting and cone pattern from one type of engine configuration to another type.

SUMMARY OF THE INVENTION

Briefly, the present invention provides fuel targeting and fuel spray distribution from fuel injectors to control hydrocarbon emissions.

In one aspect, a fuel supply apparatus is provided that provides multiple fuel spray targeting angles towards a combustion chamber of an engine. The apparatus includes a flow of fuel at a plurality of pressures and a fuel injector. The fuel injector includes an inlet and an outlet and a passage extending along a longitudinal axis from the inlet to the outlet, a seat assembly and a channel. The inlet receives the flow of fuel. The seat assembly is disposed in the passage and includes a seat, a seat surface, an orifice, a first flow surface, a sealing surface, and a metering disc. The metering disc includes a second flow surface communicating with the first flow surface and has a plurality of metering orifices extending generally parallel to the longitudinal axis. The metering orifices is located in a first circle around the longitudinal axis that is greater than a second circle defined by a projection of the sealing surface onto the metering disc. The channel is formed between the first and second flow surfaces and has a first portion changing in cross-sectional area as the channel extends outwardly from the orifice of the seat to a location that encircles the plurality of metering orifices such that the flow of fuel through the channel at a first fuel pressure forms a first spray angle oblique to the longitudinal axis and the flow of fuel at a second fuel pressure forms a second spray angle oblique to the longitudinal axis.

In yet another aspect, a fuel system is provided to supply fuel to an internal combustion engine. The fuel system includes a fuel supply, at least one fuel injector, and controller. The fuel supply provides fuel under pressure. The at least one fuel injector is in fluid communication with the fuel supply and has an inlet and an outlet and a passage extending along a longitudinal axis therethrough. The outlet has a seat assembly that includes a channel formed between confronting surfaces of a seat and a metering disc. The channel has a first portion changing in cross-sectional area as the channel extends outwardly from an orifice of the seat to a location that encircles a plurality of metering orifices. The controller varies fuel pressure supplied to the inlet of the at least one fuel injector so that fuel flowing through outlet via the seat channel and the plurality of metering orifices forms a spray angle that varies as a function of the fuel pressure.

In yet a further aspect, a method of controlling spray targeting of fuel through at least one fuel injector is provided. The at least one fuel injector includes an inlet and an outlet and a passage extending along a longitudinal axis therethrough. The outlet includes a seat assembly disposed in the passage to impart a fuel flow through the seat assembly with a radial velocity component. The method can be achieved by flowing fuel through the passage of the fuel injector; and varying a pressure of the fuel proximate the inlet so that a flow path of the fuel from the outlet of the fuel injector forms various spray angles oblique to the longitudinal axis.

BRIEF DESCRIPTIONS OF THE DRAWINGS

The accompanying drawings, which are incorporated herein and constitute part of this specification, illustrate an embodiment of the invention, and, together with the general description given above and the detailed description given below, serve to explain the features of the invention.

FIG. 3 illustrates a plan view of a metering disc of the fuel injector of FIG. 1.

DETAILED DESCRIPTION OF THE PREFERRED EMBODIMENTS

Figure 1:
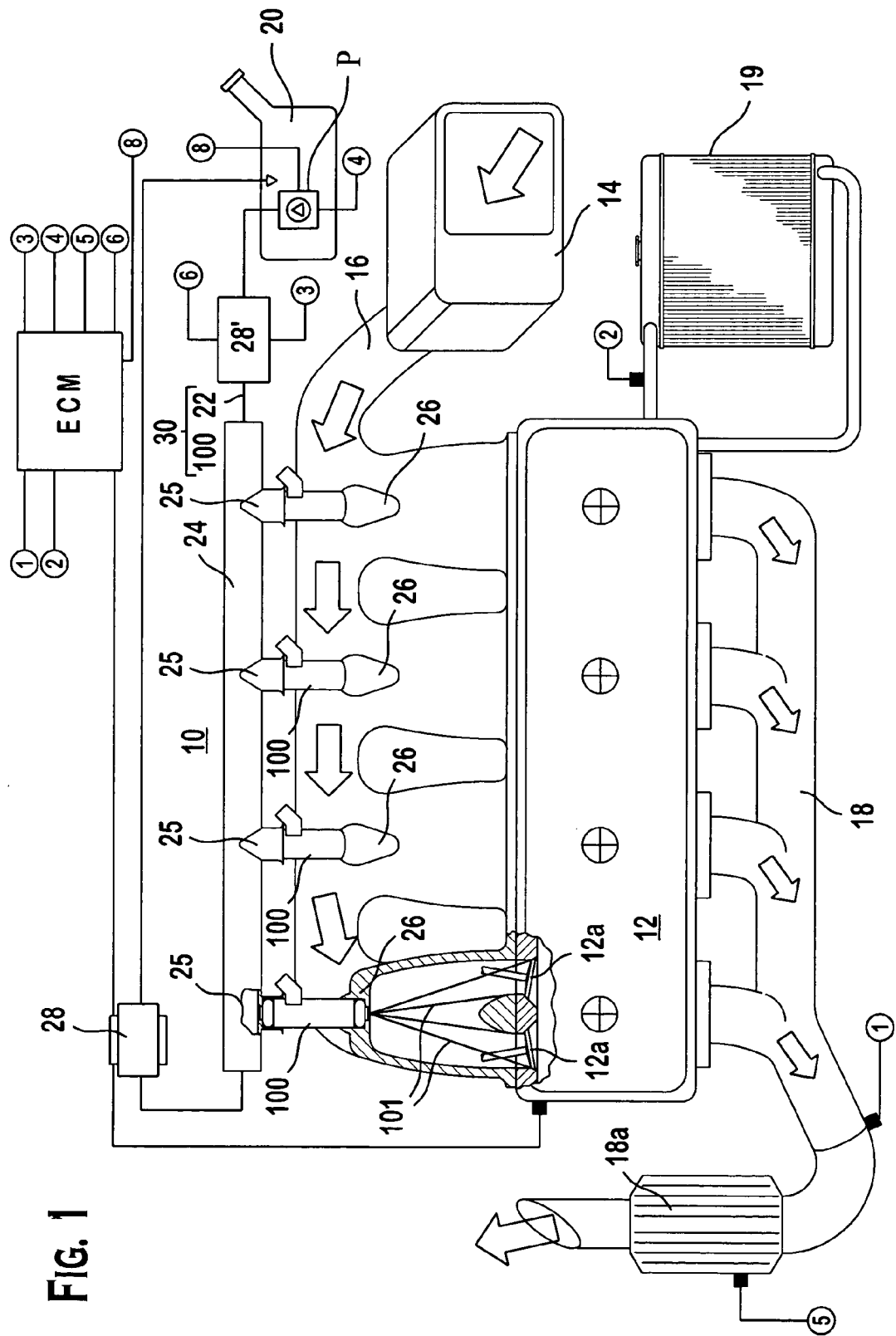
FIG. 1 illustrates a preferred embodiment of the fuel system.

FIGS. 1, 2A-2C, and 3 illustrate the preferred embodiments. Referring to FIG. 1, a fuel system 10 that can be used to provide fuel for an internal combustion engine 12 to reduce hydrocarbon emission depending the operating characteristics of the engine 12, which includes, for example, an intake 14 coupled to an intake manifold 16, exhaust manifold 18, exhaust catalyst 18a and coolant system 19 for a radiator. The fuel system 10 includes a fuel supply 20, which can include an in-tank fuel pump P, fuel line 22 in fluid communication with a fuel rail 24. The fuel rail 24 can be provided with fuel rail cups 25 for respective fuel injectors 100. The fuel injectors 100 are coupled to respective fuel injection ports 26 such as, for example, an intake manifold 16 connected to the engine 12. Air provided via the intake 14 and intake manifold 16 is combined with fuel provided by the fuel injectors 100. Air and fuel that have been combusted in the engine 12 are directed through the exhaust manifold 18 to the exhaust catalyst 18a and thereafter into the ambient environment. The fuel system 10 can be controlled to provide varying flow rates and pressures by an electronic control module ("ECM"), which can be integral with an engine or emission control unit or separate from these electronic management units. By way of an example of a separate control unit that can be integrated with the engine management system, the fuel pump P can be controlled by commercially available controller such as, for example, Aeromotive® Billet Fuel Pump Controller to regulate fuel pump voltage as a function of one or more sensed parameter (e.g., engine speed). Where the fuel system 10 is configured as a return-less fuel system, a conventional fuel management unit such as Aeromotive® Billet Digital FMU can be used as the ECM to regulate fuel pressure as a function of one or more sensed parameters (e.g., a magnitude of sensed intake manifold pressure). The ECM can be configured to receive and transmit a variety of signals as part of its control strategy. By way of example, the ECM can sense the exhaust temperature via an exhaust gas temperature sensor 1 or a pyrometer; coolant temperature via a coolant sensor 2; fuel pressure or flow rate 3; pump output via sensor 4; and exhaust catalyst 18a temperature via catalyst temperature sensor 5. The ECM can also control the pressure or flow rate of the fuel pump P by controlling a fuel pressure regulator 28 via an output signal 7; a pressure controller via output signal 6; or the pump P via output signal 8.

Of particular importance are the details of the fuel injector 100, which can be used with the ECM to provide various spray targeting configurations for the engine 12 depending on the operating characteristics of the engine 12. In order to explain how various spray targeting configurations can be achieved, a description of preferred embodiments of the fuel injector 100 is provided.

Figure 2A:
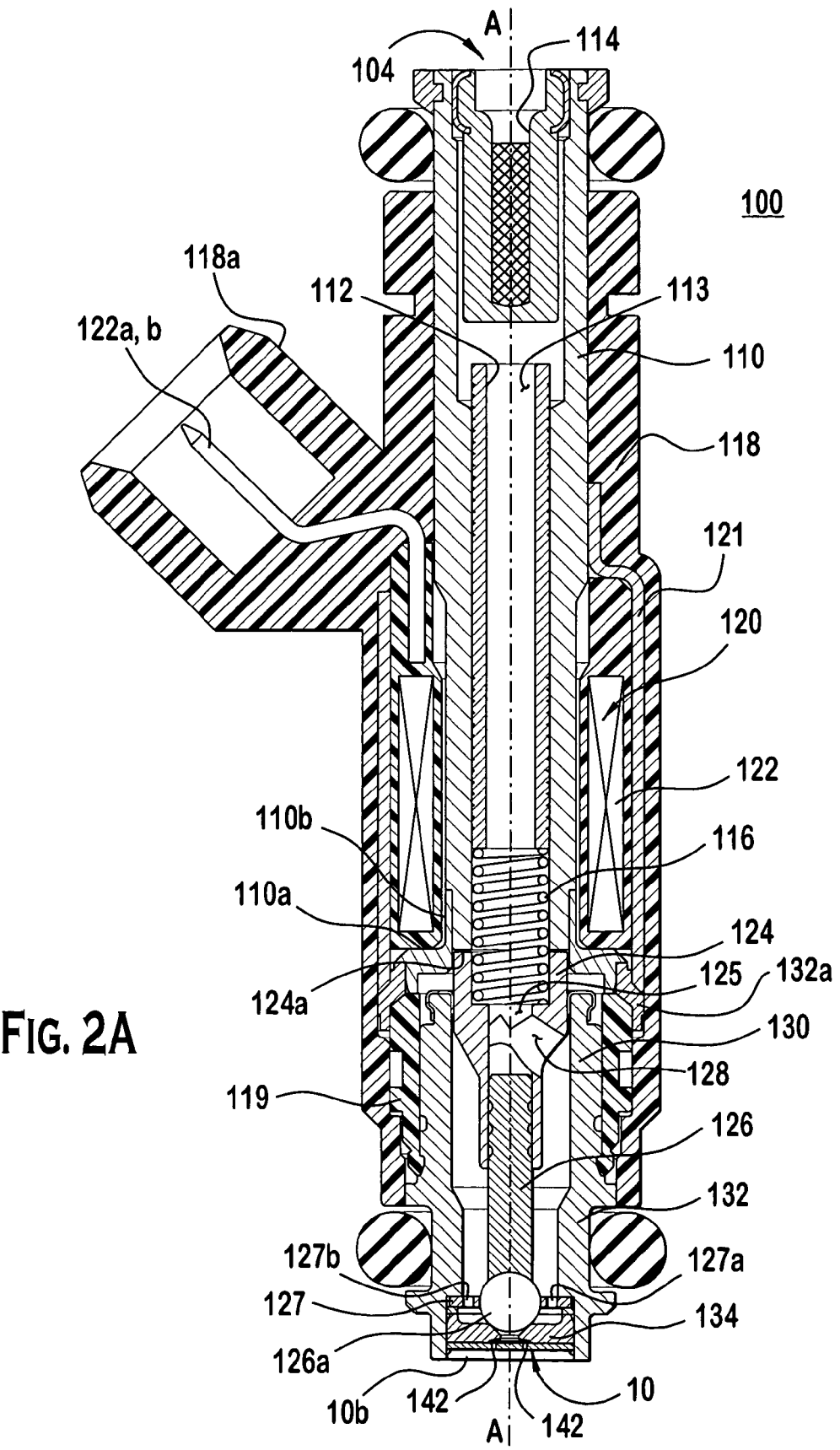
FIG. 2A illustrates one of the fuel injectors of the fuel system of FIG. 1.

Referring to FIG. 2A, the fuel injector 100 includes: an inlet 104, an outlet 106, a fuel inlet tube 110, an adjustment tube 112, a filter assembly 114, a coil assembly 118, a coil spring 116, an armature 124, a closure member 126, a non-magnetic shell 110a, a first overmold 118, a valve body 132, a valve body shell 132B, a second overmold 119, a coil assembly housing 121, a guide member 127 for the closure member 126, a seat 134, and a metering disc 102.

The guide member 127, the seat 134, and the metering disc 102 form a stack that is coupled at the outlet end of fuel injector 100 by a suitable coupling technique, such as, for example, crimping, welding, bonding or riveting. Armature 124 and the closure member 126 are joined together to form an armature/needle valve assembly. It should be noted that one skilled in the art could form the assembly as a single component. Coil assembly 120 includes a plastic bobbin on which an electromagnetic coil 122 is wound.

Respective terminations of coil 122 connect to respective terminals 122B, 122C that are shaped and, in cooperation with a surround 118a formed as an integral part of overmold 118, to form an electrical connector for connecting the fuel injector to an electronic control circuit (not shown) that operates the fuel injector.

Fuel inlet tube 110 can be ferromagnetic and includes a fuel inlet opening at the exposed upper end. Filter assembly 114 can be fitted proximate to the open upper end of adjustment tube 112 to filter any particulate material larger than a certain size from fuel entering through inlet opening before the fuel enters adjustment tube 112.

In the calibrated fuel injector, adjustment tube 112 has been positioned axially to an axial location within fuel inlet tube 110 that compresses preload spring 116 to a desired bias force that urges the armature/needle valve such that the rounded tip end of closure member 126 can be seated on seat 134 to close the central hole through the seat. Preferably, tubes 110 and 112 are crimped together to maintain their relative axial positioning after adjustment calibration has been performed.

After passing through adjustment tube 112, fuel enters a volume that is cooperatively defined by confronting ends of inlet tube 110 and armature 124 and that contains preload spring 116. Armature 124 includes a passageway 128 that communicates volume 125 with a passageway 113 in valve body 130, and guide member 127 contains fuel passage holes 127a, 127b. This allows fuel to flow from volume 125 through passageways 113, 128 to seat 134.

Non-ferromagnetic shell 10a can be telescopically fitted on and joined to the lower end of inlet tube 110, as by a hermetic laser weld. Shell 110a has a tubular neck that telescopes over a tubular neck at the lower end of fuel inlet tube 110. Shell 110a also has a shoulder that extends radially outwardly from neck. Valve body shell 132B can be ferromagnetic and can be joined in fluid-tight manner to non-ferromagnetic shell 110a, preferably also by a hermetic laser weld.

The upper end of valve body 130 fits closely inside the lower end of valve body shell 132B and these two parts are joined together in fluid-tight manner, preferably by laser welding. Armature 124 can be guided by the inside wall of valve body 130 for axial reciprocation. Further axial guidance of the armature/needle valve assembly can be provided by a central guide hole in member 127 through which closure member 126 passes.

Prior to a discussion of the description of components of a seat assembly proximate the outlet end 106 of the fuel injector 100, it should be noted that the preferred embodiments of a seat and metering disc of the fuel injector 100 allow for a targeting of the fuel spray pattern 101 (i.e., fuel spray separation) to be selected without relying on angled orifices (orifices having its wall oriented oblique to the longitudinal axis A-A). Moreover, the preferred embodiments allow the cone pattern (i.e., a narrow or large divergent cone spray pattern) to be selected based on the preferred spatial orientation of straight (i.e. parallel to the longitudinal axis) orifices.

Figure 2B:
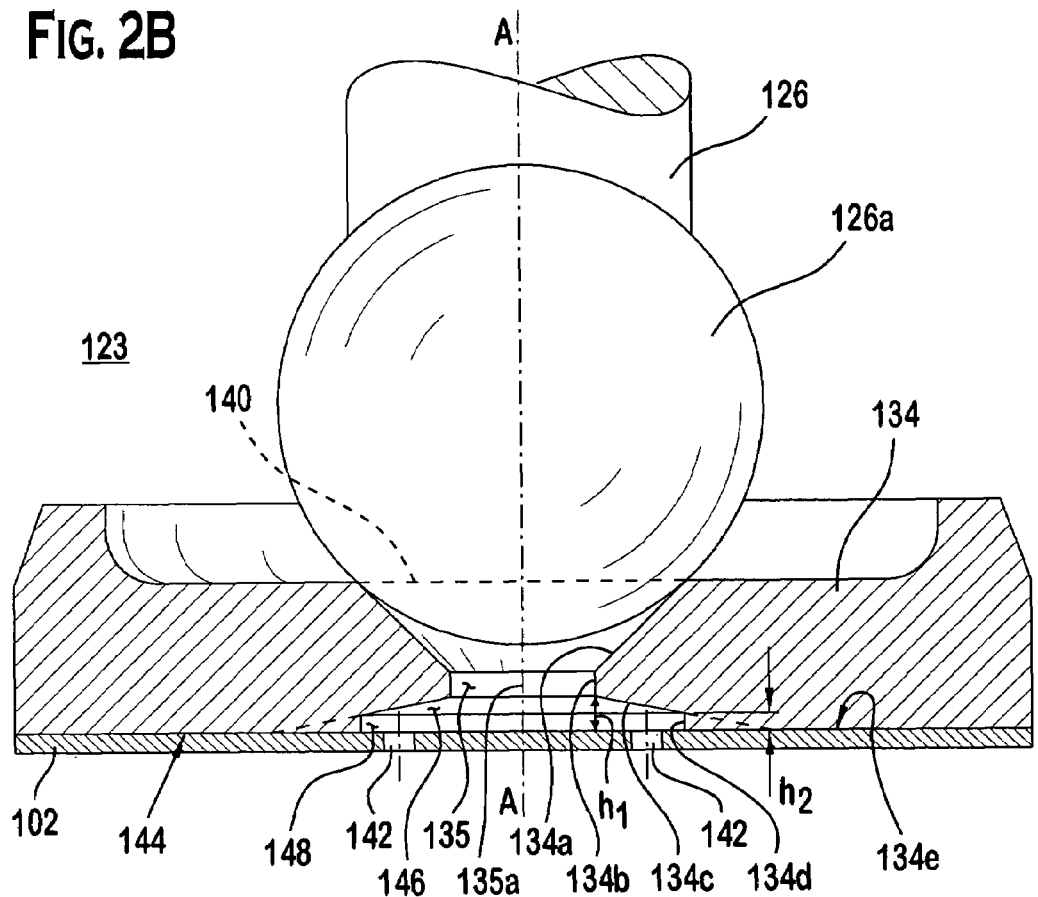
FIG. 2B illustrates close-up cross-sectional view of an outlet end of the fuel injector of FIG. 2A.

Referring to a close-up illustration of the seat assembly of the fuel injector in FIG. 2B which has a closure member 126, seat 134, and a metering disc 102. The closure member 126 includes a spherical surface shaped member 126a disposed at one end distal to the armature. The spherical member 126a engages the seat 134 on seat surface 134a so as to form a generally line contact seal between the two members. The seat surface 134a tapers radially downward and inward toward the seat orifice 135 such that the surface 134a is oblique to the longitudinal axis A-A. The words "inward" and "outward" refer to directions toward and away from, respectively, the longitudinal axis A-A. The seal can be defined as a sealing circle 140 formed by contiguous engagement of the spherical member 126a with the seat surface 134a, shown here in FIG. 2B. The seat 134 includes a seat orifice 135, which extends generally along the longitudinal axis A-A of the housing 20 and is formed by a generally cylindrical wall 134b. Preferably, a center 135a of the seat orifice 135 is located generally on the longitudinal axis A-A.

Figure 2C:
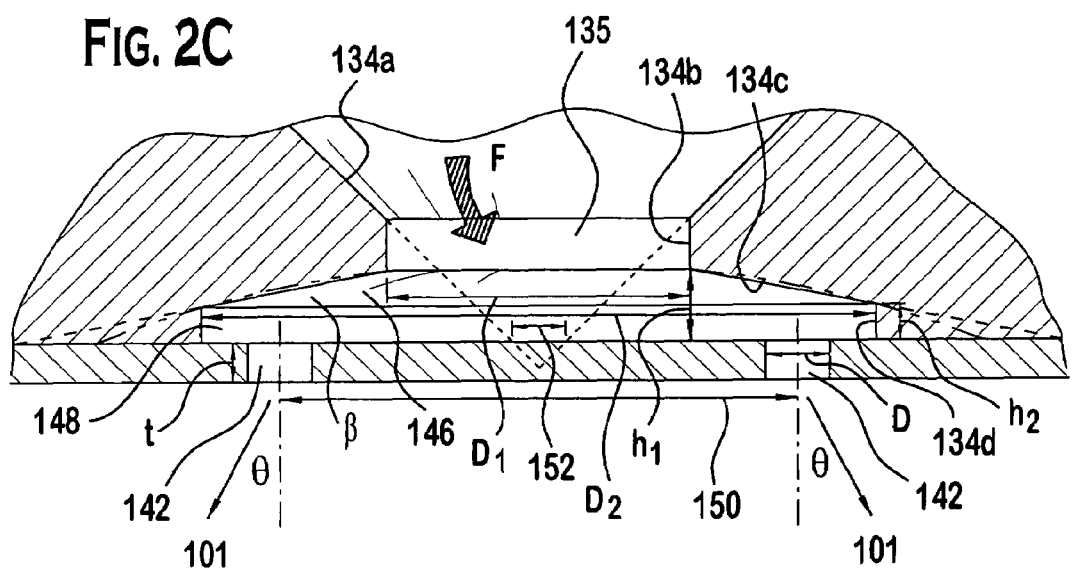
FIG. 2C illustrates a further close-up view of the preferred embodiment of the seat assembly that, in particular, shows the various relationships between various components in the subassembly.

Downstream of the circular wall 134b, the seat 134 tapers along a portion 134c towards the metering disc surface 134e. The taper of the portion 134c preferably can be linear or curvilinear with respect to the longitudinal axis A-A, such as, for example, a curvilinear taper that forms an interior dome (FIG. 2C). In one preferred embodiment, the taper of the portion 134c is linearly tapered (FIG. 2B) downward and outward at a taper angle β away from the seat orifice 135 to a point radially past the metering orifices 142. At this point, the seat 134 extends along and is preferably parallel to the longitudinal axis so as to preferably form cylindrical wall surface 134d. The wall surface 134d extends downward and subsequently extends in a generally radial direction to form a bottom surface 134e, which is preferably perpendicular to the longitudinal axis A-A. In another preferred embodiment, the portion 134c can extend through to the surface 134e of the seat 134. Preferably, the taper angle β is about 10 degrees relative to a plane transverse to the longitudinal axis A-A.

The interior face 144 of the metering disc 102 proximate to the outer perimeter of the metering disc 102 engages the bottom surface 134e along a generally annular contact area. The seat orifice 135 is preferably located wholly within the perimeter, i.e., a "bolt circle" 150 defined by an imaginary line connecting a center of each of the metering orifices 142. That is, a virtual extension of the surface of the seat 135 generates a virtual orifice circle 151 preferably disposed within the bolt circle 150.

The cross-sectional virtual extensions of the taper of the seat surface 134b converge upon the metering disc so as to generate a virtual circle 152 (FIG. 2C). Furthermore, the virtual extensions converge to an apex located within the cross-section of the metering disc 102. In one preferred embodiment, the virtual circle 152 of the seat surface 134b is located within the bolt circle 150 of the metering orifices. Stated another way, the bolt circle 150 is preferably entirely outside the virtual circle 152. Although the metering orifices 142 can be contiguous to the virtual circle 152, it is preferable that all of the metering orifices 142 are also outside the virtual circle 152.

A generally annular controlled velocity channel 146 is formed between the seat orifice 135 of the seat 134 and interior face 144 of the metering disc 102, illustrated here in FIG. 2B. Specifically, the channel 146 is initially formed between the intersection of the preferably cylindrical surface 134b and the preferably linearly tapered surface 134c, which channel terminates at the intersection of the preferably cylindrical surface 134d and the bottom surface 134e. In other words, the channel changes in cross-sectional area as the channel extends outwardly from the orifice of the seat to the plurality of metering orifices such that fuel flow F is imparted with a radial velocity between the orifice and the plurality of metering orifices. A physical representation of a particular relationship has been discovered that allows the controlled velocity channel 146 to provide a constant velocity to fluid flowing through the channel 146. In this relationship, the channel 146 tapers outwardly from a larger height $h_1$ at the seat orifice 135 with corresponding radial distance $D_1$ to a smaller height $h_2$ with corresponding radial distance $D_1$ toward the metering orifices 142. Preferably, a product of the height $h_1$, distance D1 and π is approximately equal to the product of the height $h_2$, distance $D_2$ and π (i.e. $D_1*h_1*\pi=D_2*h_2*\pi$ or $D_1*h_1=D_2*h_2$) formed by a taper, which can be linear or curvilinear. The distance $h_2$ is believed to be related to the taper in that the greater the height $h_2$, the greater the taper angle β is required and the smaller the height $h_2$, the smaller the taper angle β is required. An annular space 148, preferably cylindrical in shape with a length $D_2$, is formed between the preferably linear wall surface 134d and an interior face of the metering disc 102. That is, as shown in FIG. 2B, a frustum formed by the controlled velocity channel 146 downstream of the seat orifice 135, which frustum is contiguous to preferably a right-angled cylinder formed by the annular space 148.

By providing a constant velocity of fuel flow F flowing through the controlled velocity channel 146, it is believed that a sensitivity of the position of the metering orifices 142 relative to the seat orifice 135 in spray targeting and spray distribution is minimized. That is to say, due to manufacturing tolerances, acceptable level concentricity of the array of metering orifices 142 relative to the seat orifice 135 may be difficult to achieve. As such, features of the preferred embodiment are believed to provide a metering disc for a fuel injector that is believed to be less sensitive to concentricity variations between the array of metering orifices 142 on the bolt circle 150 and the seat orifice 135. It is also noted that those skilled in the art will recognize that from the particular relationship, the velocity can decrease, increase or both increase/decrease at any point throughout the length of the channel 146, depending on the configuration of the channel, including varying $D_1$, $h_1$, $D_2$ or $h_2$ of the controlled velocity channel 146, such that the product of $D_1$ and $h_1$ can be less than or greater than the product of $D_2$ and $h_2$.

In another preferred embodiment, the cylinder of the annular space 148 is not used and instead only a frustum forming part of the controlled velocity channel 146 is formed. That is, the channel surface 134c extends all the way to the surface 134e contiguous to the metering disc 102, referenced in FIGS. 2B and 2C as dashed lines. In this embodiment, the height $h_2$ can be referenced by extending the distance $D_2$ from the longitudinal axis A-A to a desired point transverse thereto and measuring the height $h_2$ between the metering disc 102 and the desired point of the distance $D_2$.

By imparting a different radial velocity to fuel flow F flowing through the seat orifice 135, it has been discovered that the spray separation angle of fuel spray exiting the metering orifices 142 can be changed as a generally linear function of the radial velocity. For example, in a preferred embodiment shown here in FIG. 2C, by changing a radial velocity of the fuel flowing (between the orifice 135 and the metering orifices 142 through the controlled velocity channel 146) from approximately 8 meter-per-second to approximately 13 meter-per-second, the spray separation angle changes correspondingly from approximately 13 degrees to approximately 26 degrees. The radial velocity can be changed preferably by changing the configuration of the seat assembly 123 (including $D_1$, $h_1$, $D_2$ or $h_2$ of the controlled velocity channel 146), changing the flow rate of the fuel injector, or by a combination of both.

Furthermore, it has also been discovered that spray separation targeting can also be adjusted by varying a ratio of the through-length (or orifice length) "t" of each metering orifice to the diameter "D" of each orifice. In particular, the spray separation angle is linearly and inversely related to the ratio t/D. As the ratio changes from approximately 0.3 to approximately 0.7, the spray separation angle θ generally changes linearly and inversely from approximately 22 degrees to approximately 8 degrees. Hence, where a small cone size is desired but with a large spray separation angle, it is believed that spray separation can be accomplished by configuring the velocity channel 146 and space 148 while cone size can be accomplished by configuring the t/D ratio of the metering disc 102. It should be noted that the ratio t/D not only affects the spray separation angle, it also affects a size of the spray cone emanating from the metering orifice in a linear and inverse manner. As the ratio changes from approximately 0.3 to approximately 0.7, the cone size, measured as an included angle, changes generally linearly and inversely to the ratio t/D. Although the through-length "t" (i.e., the length of the metering orifice along the longitudinal axis A-A) is shown in FIG. 2C as being substantially the same as that of the thickness of the metering disc 102, it is noted that the thickness of the metering disc can be different from the through-length t of the metering orifice 142.

The metering or metering disc 102 has a plurality of metering orifices 142, each metering orifice 142 having a center located on an imaginary "bolt circle" 150 shown here in FIGS. 2C and 3. For clarity, each metering orifice is labeled as 142B, 142C, 142c, 142d. . . and so on. Although the metering orifices 142 are preferably circular openings, other orifice configurations, such as, for examples, square, rectangular, arcuate or slots can also be used. The metering orifices 142 are arrayed in a preferably circular configuration, which configuration, in one preferred embodiment, can be generally concentric with the virtual circle 152. A seat orifice virtual circle 151 is formed by a virtual projection of the orifice 135 onto the metering disc such that the seat orifice virtual circle 151 is outside of the virtual circle 152 and preferably generally concentric to both the first and second virtual circle 150. Extending from the longitudinal axis A-A are two perpendicular lines 160a and 160b that along with the bolt circle 150 divide the bolt circle into four contiguous quadrants A, B, C and D. In a preferred embodiment, the metering orifices on each quadrant are diametrically disposed with respect to corresponding metering orifices on a distal quadrant. The preferred configuration of the metering orifices 142 and the channel allows a flow path "F" of fuel extending radially from the orifice 135 of the seat in any one radial direction away from the longitudinal axis towards the metering disc passes to one metering orifice or orifice.

In addition to spray targeting with adjustment of the radial velocity and cone size determination by the controlled velocity channel and the ratio t/D, respectively, a spatial orientation of the non-angled orifice openings 142 can also be used to shape the pattern of the fuel spray by changing the arcuate distance "L" between the metering orifices 142 along a bolt circle 150. Details of this preferred technique are shown and described in U.S. patent application Ser. No. 10/162,759, entitled "SPRAY PATTERN CONTROL WITH NON-ANGLED ORIFICES IN FUEL INJECTION METERING DISC," filed on 6 Jun. 2002, (published as U.S. Patent Application Publication No. 2003/0015595 on 23 Jan. 2003), which is incorporated by reference in its entirety into this application.

The adjustment of arcuate distances can also be used in conjunction with the process previously described so as to tailor the spray geometry (narrower spray pattern with greater spray angle to wider spray pattern but at a smaller spray angle by) of a fuel injector to a specific engine design while using non-angled metering orifices (i.e., a metering opening with its wall oriented about an axis generally parallel to the longitudinal axis A-A). Additional details of the preferred embodiments and techniques are set forth in U.S. patent application Ser. No. 10/162,759, which is pending and hereby incorporated by reference in its entirety.

In operation, the fuel injector 100 is initially at the non-injecting position shown in FIG. 2A. In this position, a working gap exists, between the annular end face 110b of fuel inlet tube 110 and the confronting annular end face 124a of armature 124. Coil housing 121 and tube 12 are in contact at 74 and constitute a stator structure that is associated with coil assembly 18. Non-ferromagnetic shell 110a assures that when electromagnetic coil 122 is energized, the magnetic flux will follow a path that includes armature 124. Starting at the lower axial end of housing 34, where it is joined with valve body shell 132B by a hermetic laser weld, the magnetic circuit extends through valve body shell 132B, valve body 130 and eyelet to armature 124, and from armature 124 across working gap 72 to inlet tube 110, and back to housing 121.

When electromagnetic coil 122 is energized, the spring force on armature 124 can be overcome and the armature is attracted toward inlet tube 110 reducing working gap 72. This unseats closure member 126 from seat 134 open the fuel injector so that pressurized fuel in the valve body 132 flows through the seat orifice and through orifices formed on the metering disc 102. It should be noted here that the actuator may be mounted such that a portion of the actuator can disposed in the fuel injector and a portion can be disposed outside the fuel injector. When the coil ceases to be energized, preload spring 116 pushes the armature/needle valve closed on seat 134.

Referring to FIG. 1, the fuel injector 100 can be utilized to reduce hydrocarbon emissions by varying the spray targeting of fuel depending on the operating characteristics of the engine. The reduction of hydrocarbons, among other features, can be achieved by varying a fuel pressure being supplied to the fuel injectors 100 to thereby vary the radial velocity of the fuel flowing through the seat assembly 123 of the fuel injector. As the fuel pressure provided to the inlet 104 of the fuel injector 100 increases, the radial velocity increases and hence the spray separation angle θ increases. Thus, various fuel pressure settings may form various spray angles oblique to the longitudinal axis A-A for a fuel supply apparatus 30, which includes at least one fuel injector 100 and a flow of fuel as provided by at least the fuel line 22. As the pressure of the fuel flowing to the fuel injector 100 increases, the spray angle θ increases due to the increase in the conversion of flow energy (generally proportional to the pressure of the fuel) by the geometry of the seat assembly 123 to impart the fuel flow F with a radial velocity such that the flow exiting the metering orifices tends to diverge from the longitudinal axis A-A.

During engine start-up and normal operating conditions, temperature parameters can be sensed to establish corresponding fuel pressures at the fuel injector inlet. At cold start, the engine temperature is typically below its normal operating temperature range. Normal operating conditions typically exist after an engine 12 has been running and its operating temperature range has been reached, such as, for example, a normal coolant temperature of about 195 degrees Fahrenheit at the outlet of a water pump to the inlet of the radiator 19. Temperature parameters to determine the operational characteristics of the engine 12 can be measured at a plurality of locations within an engine, its exhaust system, or its cooling system. For example, the temperature at a cylinder head, exhaust, catalyst, or a radiator may provide a suitable sensed temperature for the ECM.

During engine cold-start conditions when the temperature of the engine 12 is below its normal operating range, both the intake valves 12a and intake manifold 16 are relatively cold and intake manifold 16 vacuum may not rise to a suitable value due to the clearances in the components of the cold-started engine. Where manifold vacuum is low, fuel mixture atomization can be poor and large droplets may pool and fall into the combustion chamber, resulting in poor combustion and elevated hydrocarbon emissions. Therefore, to alleviate this condition, it is believed that fuel spray at the inside of the intake manifold 16 can be controlled to generate a spray pattern broader than the spray pattern under normal operating conditions (e.g., engine operating conditions at a predetermined coolant temperature over a specified duration). The larger atomized droplets of the broad spray pattern is believed to stick to the surface of the intake manifold 16 and are not drawn into the cold combustion chamber; only the smaller atomized droplets are drawn into the combustion chamber. The larger atomized droplets remain on the surface of the intake manifold 16 until there is enough manifold vacuum and/or heat to draw in or evaporate the droplets. This is believed to reduce the potentially partial combustion of the larger fuel droplets. Hence, it is believed that the preferred technique described herein results in the reduction of hydrocarbon emissions.

Conversely, under normal operating conditions or during hot-start, the intake valves 12a of the engine 12 are believed to heat up faster than the intake manifold 16 because they are generally in direct contact with combustion gases. It is believed that a better air/fuel mixture can be created by providing a narrower fuel spray pattern 101 at the back of each of the intake valves 12a so that fuel directed onto it will evaporated prior to the entry of the air/fuel mixture into the combustion chamber. Consequently, it is believed that a smaller spray angle relative to the longitudinal axis results in better combustion and lower hydrocarbon emissions.

The broader spray pattern needed for the engine start-up condition can be created by controlling the spray angle via fuel pressure provided to the inlet of the fuel injector 100. As previously mentioned, a larger spray angle θ can be established by an increase in fuel pressure at the inlet of the fuel injector (e.g., at 80 psig or higher fuel pressure at the fuel rail). Thus, a broad spray pattern with a spray angle oblique to the longitudinal axis can be established for start-up conditions. Conversely, when the fuel pressure at the fuel injector is decreased (e.g., for example, reduced to a normal fuel pressure such as, for example, 38 psig), the spray angle oblique to the longitudinal axis is decreased and spray pattern is narrowed. Therefore, depending on a suitable sensed temperature, the fuel pressure can be varied continuously over a range of fuel pressures or at discrete steps over the range of fuel pressures.

In particular, a method of varying the fuel pressure can be achieved, in part, by controlling the fuel pressure provided to the inlet 104 of the fuel injector 100. The fuel pressure can be controlled by a suitable technique, such as, for example, controlling a fuel pressure regulator 28 (with or without the ECM) in a fuel rail 24 either upstream or downstream of the fuel rail 24, controlling the output of the fuel pump, or controlling the amount of fuel being returned to the fuel tank from the fuel rail 24.

The ECM or fuel pressure regulator or controller 28 or 28' can vary the fuel pressure provided to the inlet of the fuel injector depending upon, preferably, a sensed temperature parameter or other sensed conditions such as, for example, engine speed, operating duration after cold-start, ambient atmospheric pressure or temperature. The ECM or pressure controller can sense at least one predetermined input and varies the fuel pressure delivered to the fuel injector depending on the operational characteristics of the engine 12 such as, for example, cold-start or hot-start. The sensed parameter(s) may be sensed directly or by a look-up parametric table in the ECM.

As described, the preferred embodiments, including the techniques of controlling spray angle targeting, distribution or fuel pressure control for hydrocarbon emission reduction are not limited to the preferred fuel injector described herein but can be used in conjunction with other fuel injectors such as, for example, the modular fuel injector shown and described in U.S. Pat. No. 6,676,044 issued to Dallmeyer et al. on 13-Jan.-2004, the entirety of which is incorporated by reference into this application.

While the present invention has been disclosed with reference to certain embodiments, numerous modifications, alterations and changes to the described embodiments are possible without departing from the sphere and scope of the present invention, as defined in the appended claims. Accordingly, it is intended that the present invention not be limited to the described embodiments, but that it has the full scope defined by the language of the following claims, and equivalents thereof.

What I claim is:

1. A fuel supply apparatus that provides multiple fuel spray targeting angles towards a combustion chamber of an engine, the apparatus comprising:
    a flow of fuel at a plurality of pressures; and
    a fuel injector including:
        an inlet and an outlet and a passage extending along a longitudinal axis from the inlet to the outlet, the inlet receiving the flow of fuel;

a seat assembly disposed in the passage, the seat assembly including a seat, a seat surface, an orifice, a first flow surface, a sealing surface, and a metering disc, the metering disc including a second flow surface communicating with the first flow surface, the metering disc having a plurality of metering orifices extending generally parallel to the longitudinal axis, the metering orifices being located in a first circle around the longitudinal axis that is greater than a second circle defined by a projection of the seat assembly orifice onto the metering disc; and a channel formed between the first and second flow surfaces, the channel having a first portion changing in cross-sectional area as the channel extends outwardly from the orifice of the seat to a location that encircles the plurality of metering orifices such that the flow of fuel through the channel at a first fuel pressure forms a first spray angle oblique to the longitudinal axis and the flow of fuel at a second fuel pressure forms a second spray angle oblique to the longitudinal axis.

2. The fuel apparatus according to claim 1, wherein the first spray angle is less than the second spray angle.

3. The fuel apparatus according to claim 2, wherein the first fuel pressure comprises a fuel pressure less than the second fuel pressure.

4. The fuel apparatus according to claim 3, wherein the fuel pressure is linearly to a sensed parameter.

5. The fuel apparatus according to claim 3, wherein the fuel pressure is non-linearly related to a sensed parameter.

6. The fuel apparatus according to claim 3, wherein the fuel pressure is related to a sensed parameter in discrete steps.

7. A fuel system for supplying fuel to an internal combustion engine, the fuel system comprising:

a fuel supply that provides fuel under pressure;

at least one fuel injector in fluid communication with the fuel supply, the at least one fuel injector having an inlet and an outlet and a passage extending along a longitudinal axis therethrough, the outlet having a seat assembly, the seat assembly including a channel formed between confronting surfaces of a seat and a metering disc, the channel having a first portion changing in cross-sectional area as the channel extends outwardly from an orifice of the seat to a location that encircles a plurality of metering orifices; and a controller that varies fuel pressure supplied to the inlet of the at least one fuel injector so that fuel flowing through outlet via the seat channel and the plurality of metering orifices forms a spray angle with respect to the longitudinal axis that varies as a function of the fuel pressure.

8. The fuel system according to claim 7, further comprising an internal combustion engine that receives the at least one fuel injector.

9. The fuel system according to claim 8, wherein the controller comprises a temperature sensing device in communication with an engine controller, the temperature sensing device configured to sense at least one temperature selected from a group of temperatures comprising an engine operating temperature, air temperature, water cooling temperature, exhaust temperature and operating temperature of an exhaust catalyst.

10. The fuel system of claim 9, wherein the temperature-sensing device comprises a temperature sensor.

11. The fuel system according to claim 9, wherein the controller senses a temperature of the exhaust catalyst and adjusts the fuel pressure delivered to the at least one fuel injector.

12. The fuel system according to claim 11, wherein the pressure controller includes a fuel pressure regulator valve that opens and closes in response to a control signal so that the fuel pressure to the inlet of the fuel injector is varied depending on cold-start or hot-start conditions of the engine.

13. The fuel system according to claim 11, wherein the control signal comprises a vacuum produced by an intake of an engine.

14. The fuel system according to claim 13, wherein the pressure regulator valve comprises an electronic controller and the control signal includes an electrical signal from the controller.

15. A method of controlling spray targeting of fuel through at least one fuel injector, the at least one fuel injector having an inlet and an outlet and a passage extending along a longitudinal axis therethrough, the outlet having a seat assembly disposed in the passage to impart a fuel flow through the seat assembly with a radial velocity component, the method comprising:

flowing fuel through the passage of the fuel injector towards the outlet; and varying a pressure of the fuel proximate the inlet so that a flow path of the fuel from the outlet of the fuel injector forms various spray angles oblique to the longitudinal axis;

wherein the varying comprises increasing the spray angle by increasing the fuel pressure for a cold-start condition to reduce hydrocarbon emissions and decreasing the spray angle by decreasing the fuel pressure for a hot-start condition to reduce hydrocarbon emissions.

16. The method of claim 15, wherein the varying comprises sensing a parameter indicative of one of cold-start or hot-start.

17. The method of claim 16, wherein the sensing comprises sensing a temperature selected from group of temperatures comprising a coolant temperature of a combustion engine, exhaust gas temperature of the combustion engine, and catalyst operating temperature.

18. The method of claim 15, wherein the varying comprises controlling fuel pressure to the fuel injector via a fuel pressure regulator.

19. The method of claim 15, wherein the varying comprises controlling a pressure output of a fuel pump in fluid communication with the at least one fuel injector.

20. A method of controlling spray targeting of fuel through at least one fuel injector, the at least one fuel injector having an inlet and an outlet and a passage extending along a longitudinal axis therethrough, the outlet having a seat assembly disposed in the passage to impart a fuel flow through the seat assembly with a radial velocity component, the method comprising:

flowing fuel through the passage of the fuel injector towards the outlet; and varying a pressure of the fuel proximate the inlet so that a flow path of the fuel from the outlet of the fuel injector forms various spray angles oblique to the longitudinal axis;

wherein the varying comprises increasing the spray angle by increasing the fuel pressure and decreasing the spray angle by decreasing the fuel pressure;

wherein the varying comprises sensing a parameter indicative of one of cold-start or hot-start; and wherein the sensing comprises sensing a temperature selected from group of temperatures comprising a coolant temperature of a combustion engine, exhaust gas temperature of the combustion engine, and catalyst operating temperature.

* * * * *